(12) United States Patent
Mao

(10) Patent No.: US 6,751,917 B2
(45) Date of Patent: Jun. 22, 2004

(54) FLOOR TILE STRUCTURE WITHOUT ADHESIVE COATING AT THE BOTTOM

(76) Inventor: Chen-Chi Mao, 7th Foor, No. 20, Pa Te Road, Section 3, Taipei (TW)

(*) Notice: Subject to any disclaimer, the term of this patent is extended or adjusted under 35 U.S.C. 154(b) by 0 days.

(21) Appl. No.: 10/118,994

(22) Filed: Apr. 10, 2002

(65) Prior Publication Data

US 2003/0192274 A1 Oct. 16, 2003

(51) Int. Cl.[7] ............................................. E04F 13/08
(52) U.S. Cl. .................... 52/392; 52/309.5; 52/384; 52/592.1; 428/53; 428/77; 428/192; 428/214; 428/317.7
(58) Field of Search ..................... 52/390, 392, 592.1, 52/384, 309.5; 428/315.5, 192, 53, 77, 214, 317.1, 317.7, 318.6, 319.9, 462

(56) References Cited

U.S. PATENT DOCUMENTS

| | | | |
|---|---|---|---|
| 1,156,753 A | * 10/1915 | Carney | |
| 1,472,521 A | * 10/1923 | Harrison | |
| 2,884,779 A | * 5/1959 | Buergin et al. | |
| 4,282,697 A | * 8/1981 | Spielau et al. | 52/746.11 |
| 4,388,361 A | * 6/1983 | Vassalli | 428/192 |
| 4,796,402 A | * 1/1989 | Pajala | 52/390 |
| 4,840,825 A | * 6/1989 | Aristodimou | 428/77 |
| 4,931,331 A | * 6/1990 | Owens | 428/47 |
| 5,058,349 A | * 10/1991 | Conrad | 52/392 |
| 5,208,086 A | * 5/1993 | Owens | 428/47 |
| 5,540,025 A | * 7/1996 | Takehara et al. | 52/403.1 |
| 5,830,549 A | * 11/1998 | Sweet et al. | 428/40.1 |
| 5,952,076 A | * 9/1999 | Foster | 428/77 |
| 6,021,615 A | * 2/2000 | Brown | 52/392 |
| 6,182,413 B1 | * 2/2001 | Magnusson | 52/589.1 |
| 6,673,412 B2 | * 1/2004 | Ramesh et al. | 428/77 |

* cited by examiner

*Primary Examiner*—Brian E. Glessner
*Assistant Examiner*—Yvonne M. Horton
(74) *Attorney, Agent, or Firm*—Bacon & Thomas, PLLC.

(57) ABSTRACT

A floor tile structure, provided that a surface layer and a bottom layer are attached respectively on the upper and the lower surfaces of the soft double-sided adhesive tape with pressure sensitivity, wherein the surface layer is possibly made of ceramic, rock, metal or other hard material and the periphery is a smooth cross-section; and, the bottom layer is a hard adhesive layer, wherein the continuous periphery is concave relative to the periphery and the other opposite continuous periphery is complementarily convex; further, the concave periphery is buried in the inner edge of the periphery of the surface layer and the convex periphery is protruded to the outer edge of the periphery of the surface layer; as for the two floor tiles with the above-mentioned structure, with the adhesive layer in the convex site on the bottom layer being attached with the concave periphery on the bottom layer of the other floor tile, the tiles can be laterally apposed to pave on the working floor.

5 Claims, 1 Drawing Sheet

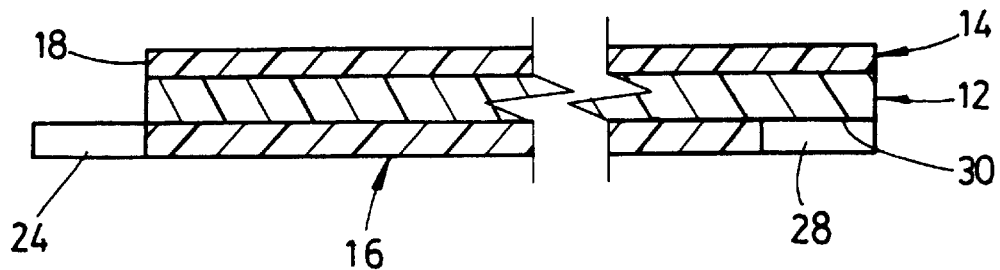
FIG. 1
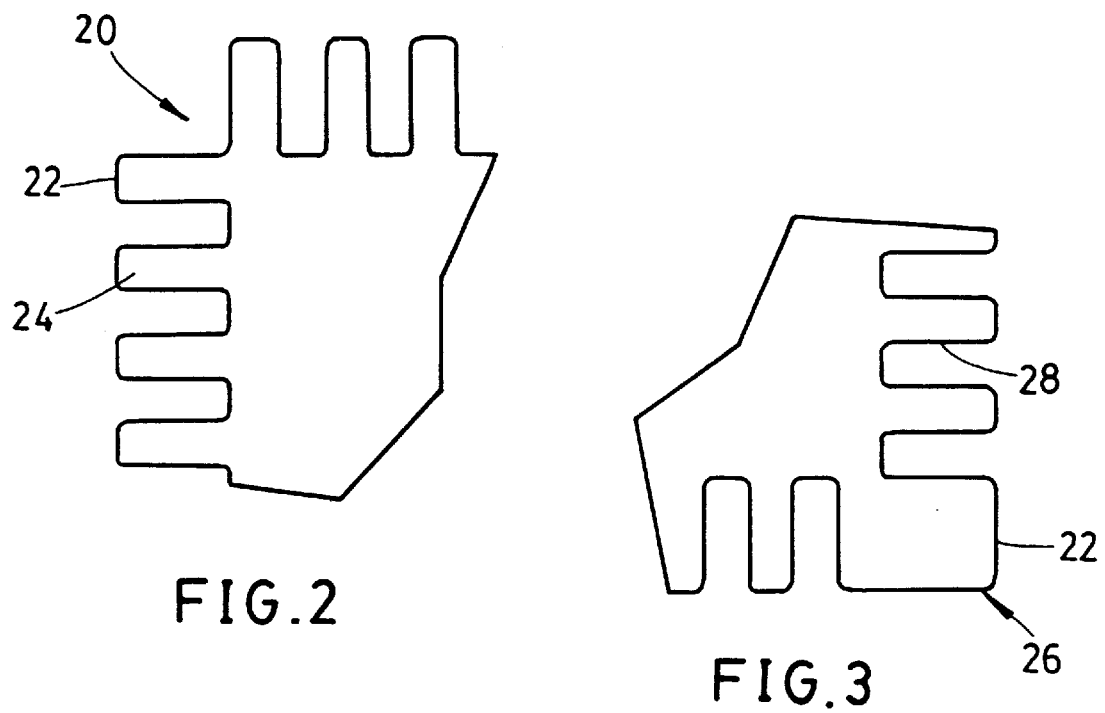
FIG. 2
FIG. 3
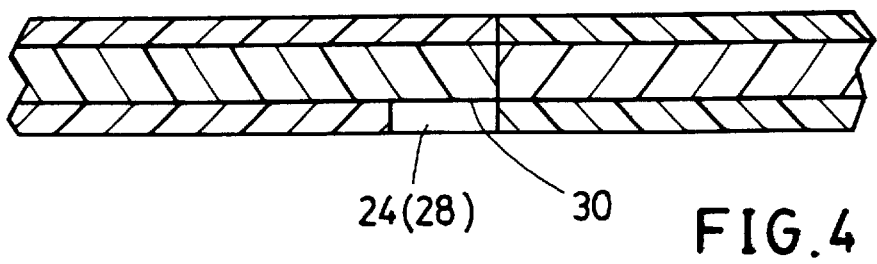
FIG. 4

FLOOR TILE STRUCTURE WITHOUT ADHESIVE COATING AT THE BOTTOM

BACKGROUND OF THE INVENTION

1. Field of the Invention

A floor tile structure, which comprises a hard surface layer, a bottom layer, and a soft adhesive intermediate layer, wherein the periphery of the bottom layer is configured with a convex edge and a complementarily concave edge; and, the convex edge is protruded on the periphery of the surface layer, and the concave edge is embedded in the periphery of the surface layer.

2. Description of the Background Art

The plastic floor tile is known to be the easiest implementation and the most reasonable price. But, as is known to all, when the plastic floor tile is attached on the floor, it commonly uses direct adhesive coating on the floor, or the self-adhesive floor tile, which is coated with the adhesive on the back of the floor tile in advance during manufacturing. Both of them are served with the same goal for securely adhering the floor tile on the floor. Opposite to the convenience and stability during adhering, the shoveling for the plastic floor tile during retrofitting is very time-consuming and easy to have adhesive residual on the floor such that it is the most criticized point except the advantage. Over the years, the industry is looking for a substitute for the product without adhesive coating, but they were all failed eventually. For example, the existed foaming sectional floor tile is formed with ragged toothing edge on the periphery that, with the engagement of tooth edges for each other, the floor tiles can be laterally joined. But the largest disadvantage for the foaming floor tile is of a too soft material, so that it will be over-fallen under partial pressure causing the relative protrusion of another floor tile. The effect is frequently occurred at the seam between floor tiles so as to generate the similar floor tile warping causing stumbling of pedestrian. Therefore, such floor tile is difficult to be applied as a floor tile material in the public place or an ordinary family but at most in a place with lower loading, like the playground, preventing the improper collision by the children. The further disadvantage of the foaming sectional floor tile is that the surface embossment and the color is too stiff to exhibit the material feeling for high-class floor tile.

SUMMARY OF THE INVENTION

The present invention is a floor tile structure, which provides a floor tile structure for laterally joining each piece and directly paving with the joined floor tiles on the floor without adhesive coating. The structure of the floor tile is to attach a surface layer and a bottom layer on the upper and lower surfaces of a soft double-sided adhesive tape with pressure sensitivity, wherein the surface layer is provided with a straight periphery, and the bottom layer is provided with a continuous periphery in concave shape relative to the edge and another continuous periphery in convex shape relative to the concave periphery; further, the concave periphery of the bottom layer is embedded in the inner edge of the periphery of the surface layer after joining with the surface layer; and, the convex periphery of the bottom layer is protruded to the outer edge of the periphery of the surface layer.

The above-mentioned joining method for the floor tile is to engage the convex periphery of one floor tile with the concave periphery of another floor tile so that the joining of two peripheries will not become embedded causing undetachable effect. The reason of the lateral joining for the floor tile is that the top of the concave portion in the concave periphery is one of the adhering surface of the double-sided adhesive tape. Although the top of the concave portion is only a small area, it can just adhere the convex portion of the engaged convex periphery, and, by adhering each convex portion onto the concave portion, two pieces of floor tiles can be laterally adhered together as a floor tile surface extending to the wall. The structure according to the present invention for mutually lateral adhesion for floor tiles is further characterized in: after joining the soft double-sided adhesive tape with pressure sensitivity with the hard convex portion of the bottom layer, it will generate a very large lateral tensile strength to prevent the improper detachment between two joined floor tiles so that it can effectively prevent the tearing effect at the joint as in the conventional foaming sectional floor tile. This effect will be illustrated with that a double-sided adhesive tape can be used to hang a mirror on the wall. The present invention is further characterized in: the surface layer can be provided with different material variation, such as metal, ceramic or hard plastic, to exhibit an appearance as a completely real material feeling. Certainly, the color and the pattern can be more versatile to completely overturn the design rule for conventional ceramic floor tile, rock and plastic floor tile. Moreover, the present invention is provided with the surface layer and the bottom layer being of harder material and the intermediate layer being of soft adhesive layer. Thus, it can not only provide the comfortable stepping-on feeling as the foaming sectional floor tile, but also provide a smaller deformation by pressure and a corresponding effect for not easily unfolding by kicking at the seams. Most importantly, the present invention has no need of adhesive coating during the joining for the floor tiles, so that there will be no residual adhesive after paving during retrofitting and the double-sided adhesive tape with pressure sensitivity also realize the repetitive operation for the detachment at any time. Therefore, it can proceed with effective pattern combination without destroying the original floor tile structure and sufficiently realize the intention for DIY.

BRIEF DESCRIPTION OF THE DRAWINGS

FIG. 1 is a cross-sectional view of a single structure according to the present invention;

FIGS. 2 and 3 are partial schematic views of the edges of the floor tile according to the present invention;

FIG. 4 is a cross-sectional view of the joining according to the present invention.

DESCRIPTION OF THE PREFERRED EMBODIMENTS

A preferred embodiment according to the present invention is to attach a surface layer 14 and a bottom layer 16 on the upper and lower surfaces of the structure composed of a double-sided adhesive tape with pressure sensitivity in the intermediate layer 12, wherein the periphery 18 of the surface layer 14 is straight and provided with the structure made of hard material, such as ceramic, metal, rock or hard plastic. The bottom layer 16 is made of hard plastic or hard rubber and provided with a continuous periphery 20, as the L-type periphery shown in FIG. 2, forming as a convex portion 24 relative to the edge 22; and with another continuous periphery 26 in the bottom layer 16, as the L-type periphery shown in FIG. 3, forming as a concave portion 28 relative to the edge 22, and the concave portion 28 and the convex portion 24 can be formed as complementary in shape; further, the top surface 30 of the concave portion 28 is another adhesive surface of the intermediate layer 12.

The floor tile structure according to the present invention is to laterally join two floor tiles with each other, with the joining manner shown in FIG. 4, wherein the convex portion 24 of one floor tile is engaged with the concave portion 28 of another floor tile, and the top surface of the convex portion 24 is attached with the top surface 30 of the concave portion 28. Thus, by engaging and adhering a plurality of convex portions 24 on the periphery of one floor tile with the concave portions 28 of another floor tile, these two floor tiles can be laterally joined. The convex portions 24 and the concave portions 28 for lateral joining between the floor tiles are not limited to the shapes shown in the figure, but may have any kinds of convex and concave shapes. The mutual engagement is not only purely joining two floor tiles, but only insert the convex portion 24 into the concave portion 28 for attaching on the concave portion 28. Therefore, it is not only a simple engagement function. Moreover, when the convex portion 24 and the concave portion 28 are engaged but not adhered, they don't have mutual limitation and can be separated laterally that this structure is different from the conventional engagement structure with male and female tenons.

What is claimed is:

1. A floor tile structure comprising an upper layer, a double sided adhesive tape layer, and a bottom layer, said adhesive layer is a soft and double sided adhesive tape layer having a first and second side, said first side of said adhesive layer is attached to the upper layer of said tile which is a hard material and the second side of said adhesive tape layer is attached to the bottom layer on one side and the other side of the bottom layer is free of adhesive, said bottom layer is a hard plastic; wherein the periphery edge of the upper layer is straight, and one continuous or neighbored periphery of the lower layer has a concave shape relative to the edge and the other continuous or neighbored periphery has a convex shape relative to the edge, wherein the convex portion is protruded to the outside of the periphery of the surface layer, and the concave portion is withdrawn in the inner side of the periphery of the upper layer; and wherein a top surface of the concave portion of the floor tile is a partial portion of one of the adhesive surface in the adhesive layer.

2. A floor tile structure as set forth in claim 1, wherein the concave portion and the convex portion of the floor tile are in complementary shapes.

3. A floor tile structure as set forth in claim 1, wherein two pieces of the floor tiles with the same shape are adhered and joined as a whole by engaging the convex portion with the concave portion.

4. The floor tile structure of claim 1, wherein the upper layer is a metal, ceramic or hard plastic.

5. The floor tile structure of claim 3, wherein the upper layer is a metal, ceramic or hard plastic.

* * * * *